United States Patent
Eerola et al.

(10) Patent No.: US 7,706,431 B2
(45) Date of Patent: Apr. 27, 2010

(54) SYSTEM AND METHOD FOR PROVIDING OPTIMIZED RECEIVER ARCHITECTURES FOR COMBINED PILOT AND DATA SIGNAL TRACKING

(75) Inventors: Ville Eerola, Hämeenlinna (FI); Samuli Pietilä, Tampere (FI); Harri Valio, Kammenniemi (FI)

(73) Assignee: Nokia Corporation, Espoo (FI)

( * ) Notice: Subject to any disclaimer, the term of this patent is extended or adjusted under 35 U.S.C. 154(b) by 1059 days.

(21) Appl. No.: 11/170,876

(22) Filed: Jun. 30, 2005

(65) Prior Publication Data

US 2007/0009014 A1    Jan. 11, 2007

(51) Int. Cl.
*H04B 1/00* (2006.01)
(52) U.S. Cl. .................................... 375/150
(58) Field of Classification Search ......... 375/144–145, 375/148–150, 343; 342/357.06, 357.07, 342/357.08, 357.09, 357.1, 357.12
See application file for complete search history.

(56) References Cited

U.S. PATENT DOCUMENTS

| | | | | |
|---|---|---|---|---|
| 5,493,588 | A * | 2/1996 | Lennen | 375/343 |
| 6,239,743 | B1 * | 5/2001 | Lennen | 342/357.12 |
| 6,282,231 | B1 * | 8/2001 | Norman et al. | 375/144 |
| 6,317,454 | B1 * | 11/2001 | Mamori | 375/147 |
| 6,763,058 | B1 * | 7/2004 | Morris | 375/141 |
| 6,868,110 | B2 * | 3/2005 | Phelts et al. | 375/144 |
| 6,873,288 | B2 * | 3/2005 | Heppe | 342/357.12 |
| 7,463,979 | B2 * | 12/2008 | King | 701/213 |
| 2005/0012664 | A1 | 1/2005 | Gerein | |
| 2006/0274821 | A1 * | 12/2006 | Chen et al. | 375/149 |

FOREIGN PATENT DOCUMENTS

| | | |
|---|---|---|
| EP | 0 880 713 | 4/1997 |
| GB | 2 351 864 | 1/2001 |
| WO | WO 99/31817 | 6/1999 |
| WO | WO 2005/006012 A1 | 1/2005 |

OTHER PUBLICATIONS

GPS Dictionary A-G, www.datatraxus.com, Datatrax LLC, Apr. 19, 2005, pp. 1-12.
GPS Dictionary H-O, www.datatraxus.com, Datatrax LLC, Apr. 19, 2005, pp. 1-7.
GPS Dictionary P-U, www.datatraxus.com, Datatrax LLC, Apr. 19, 2005, pp. 1-8.

(Continued)

*Primary Examiner*—Khanh C Tran
(74) *Attorney, Agent, or Firm*—Foley & Lardner, LLP (57) ABSTRACT

A system architecture for a receiver to process multiple signals on a common carrier frequency from a satellite. The receiver is arranged such that the receiver receives input data transmitted from the satellite. A pilot signal is tracked from the input data using a correlation channel, and a data signal is tracked from the input data using a data code generator operatively connected to the correlation channel. In one embodiment of the invention, the data signal generator creates replica code for the data signal. In another embodiment of the invention, the system can switch between the data signal generator and pilot signal generator based upon the signal-to-noise ratio of the incoming signal.

11 Claims, 6 Drawing Sheets

OTHER PUBLICATIONS

GPS Dictionary P-U, www.datatraxus.com, Datatrax LLC, Apr. 19, 2005, pp. 1-8.

GPS Dictionary V-Z, www.datatraxus.com, Datatrax LLC, Apr. 19, 2005, pp. 1-8.

How GPS Receivers Work, Howstuffworks "How GPS Receivers Work", http://electronics.howstuffworks.com, Apr. 19, 2005, pp. 1-2.

How GPS Receivers Work, Howstuffworks "How GPS Receivers Work", Trilateration Basics, http://electronics.howstuffworks.com, Apr. 19, 2005, pp. 1-3.

How GPS Receivers Work, Howstuffworks "How GPS Receivers Work", 2-D Trilateration, http://electronics.howstuffworks.com, Apr. 19, 2005, pp. 1-3.

How GPS Receivers Work, Howstuffworks "How GPS Receivers Work", Differential GPS, http://electronics.howstuffworks.com, Apr. 19, 2005, pp. 1-2.

How GPS Receivers Work, Howstuffworks "How GPS Receivers Work", Using the Data http://electronics.howstuffworks.com, Apr. 19, 2005, pp. 1-3.

All-Digital GPS Receiver Mechanization, Peter C. Ould and Robert J. Van Wechel, Navigation: Journal of the Institute of Navigation, vol. 28, No. 3, Fall 1981, U.S.A., pp. 178-188.

GPS Signal Structure and Performance Characteristics, J.J. Spilker, Jr., Navigation: Journal of the Institute of Navigation, vol. 25, No. 2, Summer 1978, U.S.A., pp. 121-148.

Theory of Spread-Spectrum Communications—A Tutorial, Raymond L. Pickholtz and Donald L. Schilling, and Laurence B. Milstein, IEE Transactions on Communications, vol. Com-30, No. 5, May 1982, pp. 855-884.

International Search Report for Application PCT/IB2006/001793.

\* cited by examiner

SYSTEM AND METHOD FOR PROVIDING OPTIMIZED RECEIVER ARCHITECTURES FOR COMBINED PILOT AND DATA SIGNAL TRACKING

FIELD OF THE INVENTION

The present invention relates generally to receivers for Global Navigation Satellite Systems. More particularly, the present invention relates to hardware configurations for Global Navigation Satellite System receivers.

BACKGROUND OF THE INVENTION

Satellite navigation is based on a global network of satellites that transmit signals from several thousand miles in earth orbit. A number of different Global Navigation Satellite Systems (GNSS) have either been launched or are in advanced stages of development. For example, a Galileo is an example of a GNSS system which will ultimately provide a highly accurate, guaranteed global positioning service under civilian control. It is anticipated that Galileo will be inter-operable with other global satellite navigation systems such as American-based Global Position System (GPS) and the Russian-based Global Orbiting Navigation Satellite System (GLONASS).

In a GNSS such as Galileo (when available), a user is able to use his or her receiver to compute the receiver's a position using any of the satellites in any combination. It is anticipated that a system such as Galileo will be capable of delivering real-time positioning accuracy within a matter of meters.

New and proposed GNSS systems, such as Galileo, as well as a modernized GPS, will use two separate signals. One signal, referred to herein as the pilot signal, is used to provide good acquisition and tracking properties. The other signal, referred to herein as the data signal, is used to carry the satellite data message. GNSS receivers need to possess the ability to receive both signals in order to operate satisfactorily. The pilot signal is used for efficient acquisition and low signal-to-noise ratio (SNR) tracking. The data signal is used to receive the satellite data message that is required for navigation. It should be noted that, while the receiver needs the information contained in the satellite data message, it does not matter how the information is obtained. For example, an aided GNSS system may obtain the data using other forms of communication. However, if the receiver is intended for standalone use (i.e., without any aiding sources), then it does need to obtain the data message when in standalone operation. Standalone capabilities are often required features of GNSS receivers.

If the GNSS system at issue has separate pilot and data signals, then the GNSS satellites transmit the pilot and data signals on a common carrier frequency. The pilot signal and the data signal are designed so that the receiver can distinguish between the two signals. The GNSS receiver needs to be able to receive two signals from each satellite that is used for the particular transmission, although the reception does not need to be simultaneous. However, the need to receive two separate signals makes the required hardware for the receiver bigger. The hardware size is also directly tied to the product cost. To solve this problem, more efficient receiver architectures are needed which minimize the hardware complexity.

Conventional GNSS systems do not utilize separate pilot and data signals. Currently, GPS coarse/acquisition (C/A) code and precise/encrypted (P/Y) code could be considered to be somewhat similar to pilot and data signals, respectively, but such arrangements are not generally available for commercial GPS receivers. In the past, P/Y-code capable GPS receivers have implemented completely separate hardware for reception of the C/A code and the P/Y code. However, this involves essentially duplicating the hardware involved, which increases the product complexity and cost. Although some military-grade receivers can directly acquire the P/Y code without utilizing C/A code, this requires even more expensive receiver hardware.

Figure 1:
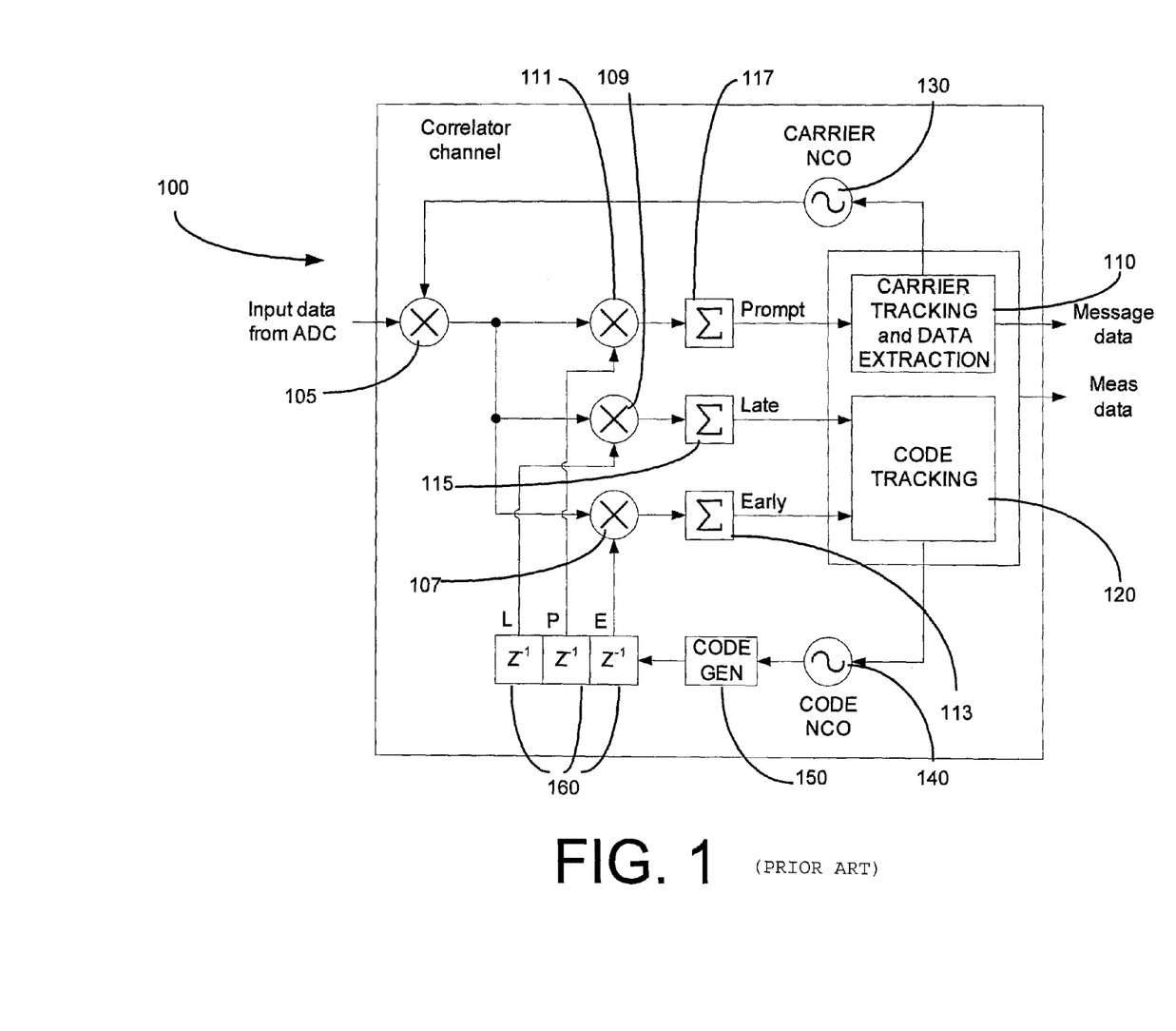
FIG. 1 is a representation of a conventional GNSS receiver correlation channel that is used to track a single satellite channel.
Figure 2:
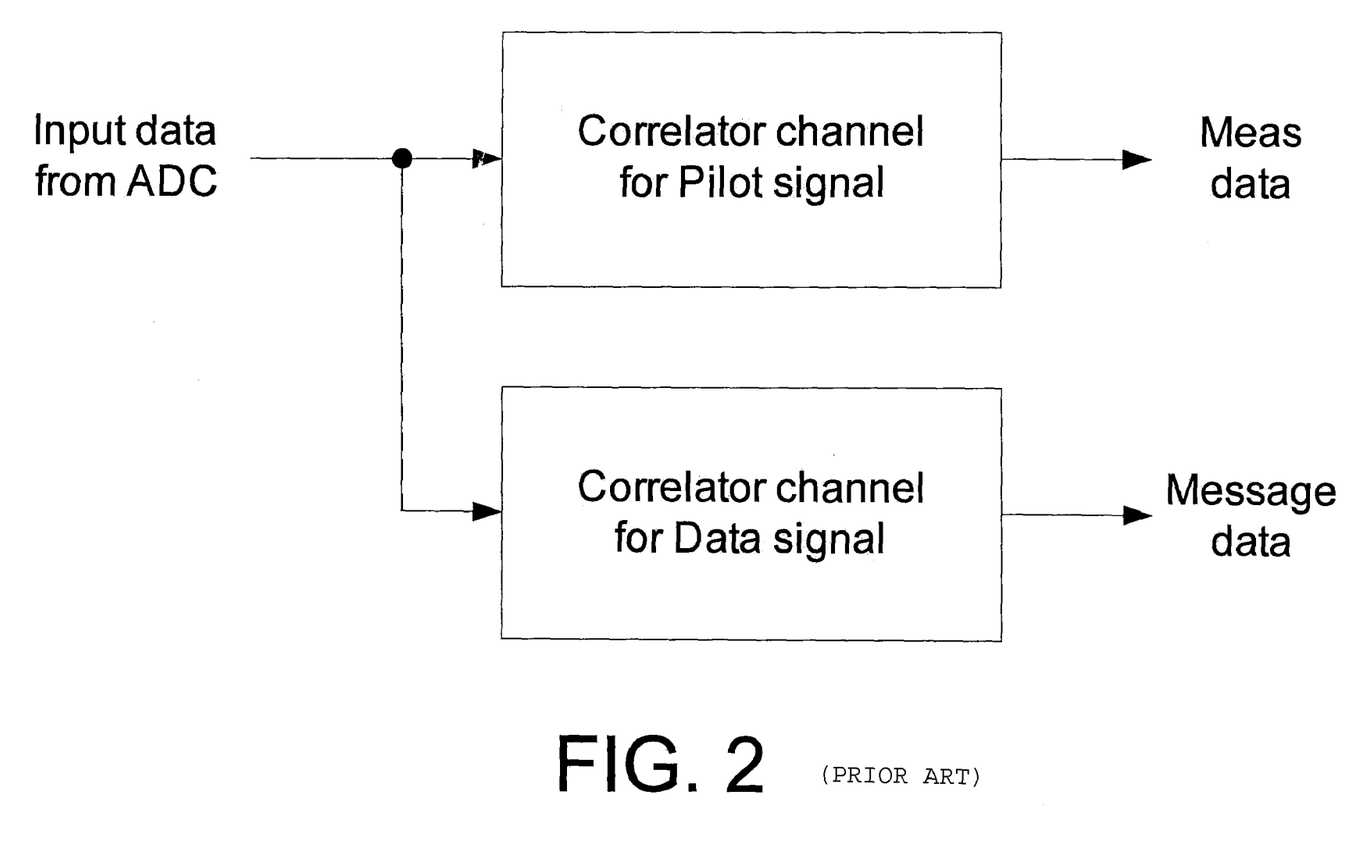
FIG. 2 is a representation showing how two receiver correlation channels can be used to receive both pilot signals and data signals from a satellite.

FIG. 1 shows a typical conventional GNSS receiver correlation channel that is used to track one satellite signal (either a data signal or a pilot signal). There are several variations for achieving a smaller hardware configuration or a higher performance level. FIG. 2 shows how two such channels can be used to use both pilot and data signals from one satellite, thus duplicating the hardware size needed for each satellite. In this arrangement, a correlator channel for the pilot signal is used for measurement data, while a correlator channel for the data signal is used for message data. "Measurement data" refers to the measurement data that the receiver generates regarding the signal timing. This data is used in the position and velocity computation process in the receiver. This data typically includes code phase information, carrier phase information, and code and carrier frequency information.

In the conventional GPS implementation, the C/A code and the P/Y code are such different and require so different processing rates that using a common processing channel to achieve the reception of both signals is not cost-effective.

SUMMARY OF THE INVENTION

The present invention provides for a system and method for efficiently reducing the hardware complexity required for enabling the reception of both a pilot signal and a data signal in a GNSS receiver. In one embodiment of the invention, information from the pilot signal is used to track both signals from the satellite such that only the demodulation of the data signal is necessary for efficient operation. A second embodiment of the invention involves the implementation of only one hardware channel to alternately track both the pilot signal and the data signal. In this situation, for satellite acquisition, the pilot signal is used, and for high signal-to-noise ratio tracking, the data signal is used. The pilot signal is used for low signal-to-noise ratio tracking.

The system and method of the present invention provides a solution for enabling a receiver to receive both pilot and carrier signals from a GNSS satellite with minimal hardware. In the case where information from the pilot signal is used to track both signals from the satellite, there is a minimal performance penalty through the use of some additional hardware. In the case where a single hardware channel alternately tracks both the pilot signal and the data signal, there is no hardware size increase at all over receivers capable of only using the data signal, although some performance is sacrificed compared to receivers that receive both signals simultaneously. However, this performance is still substantially better than with those receivers that only track the data signal. Tracking only either the pilot or data signal simplifies the software. Using less hardware also decreases the power consumption of the receiver.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE INVENTION

Figure 5:
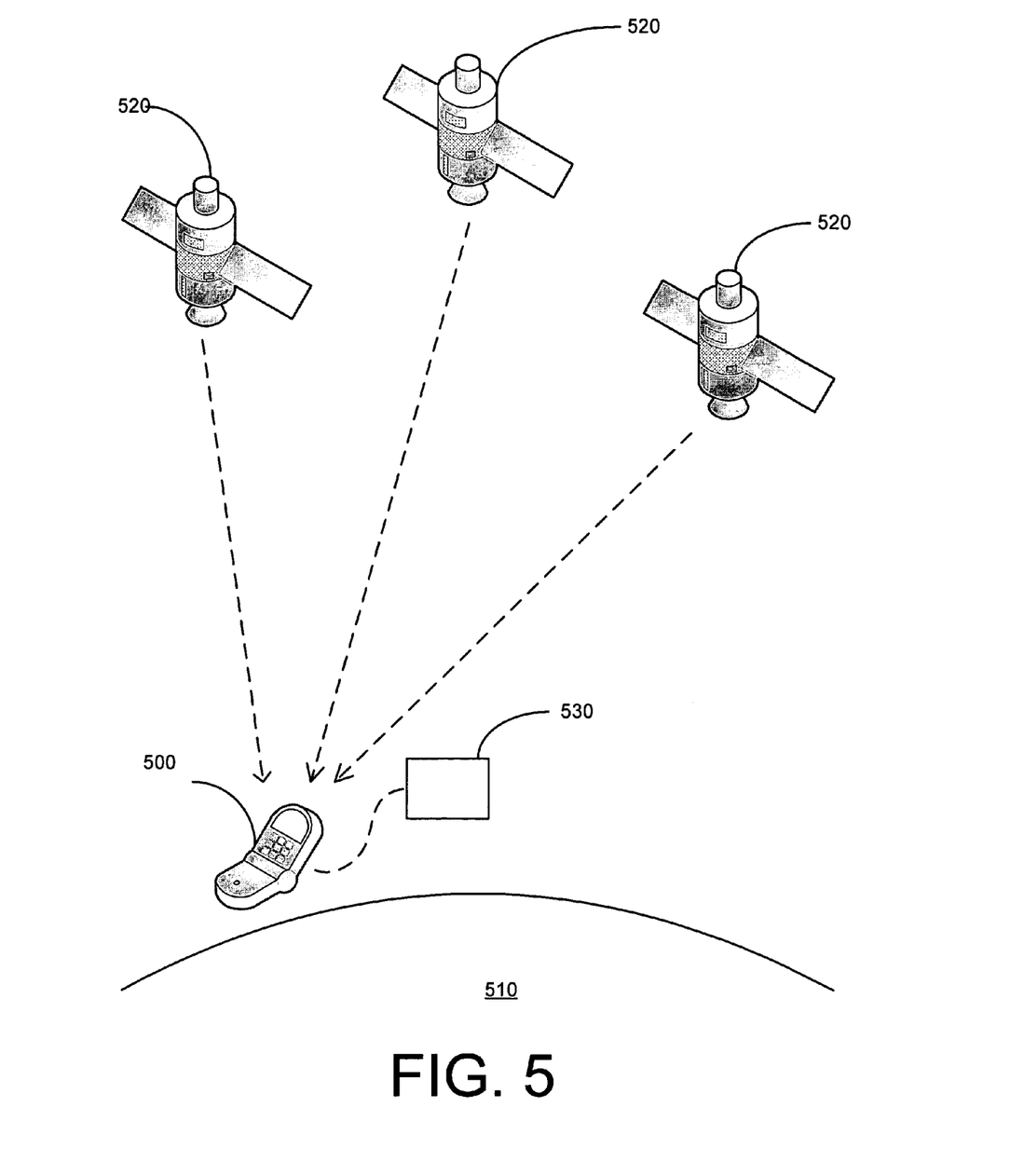
FIG. 5 is a representation showing a generic receiver and satellite system within which the present invention may be implemented.

The present invention provides for a system and method for efficiently reducing the hardware complexity required for enabling the reception of both a pilot signal and a data signal in a GNSS receiver. FIG. 5 shows a generic representation of a system within which the present invention operates. As shown in FIG. 5, a receiver 500 is located at a particular location on the Earth 510 at a given moment, and a plurality of satellites 520 orbit the Earth 510. Each of the satellites 520 is capable of transmitting information to the receiver 500, which can receive a number of the signals, possibly with the help of an assistance mechanism 530.

Figure 6:
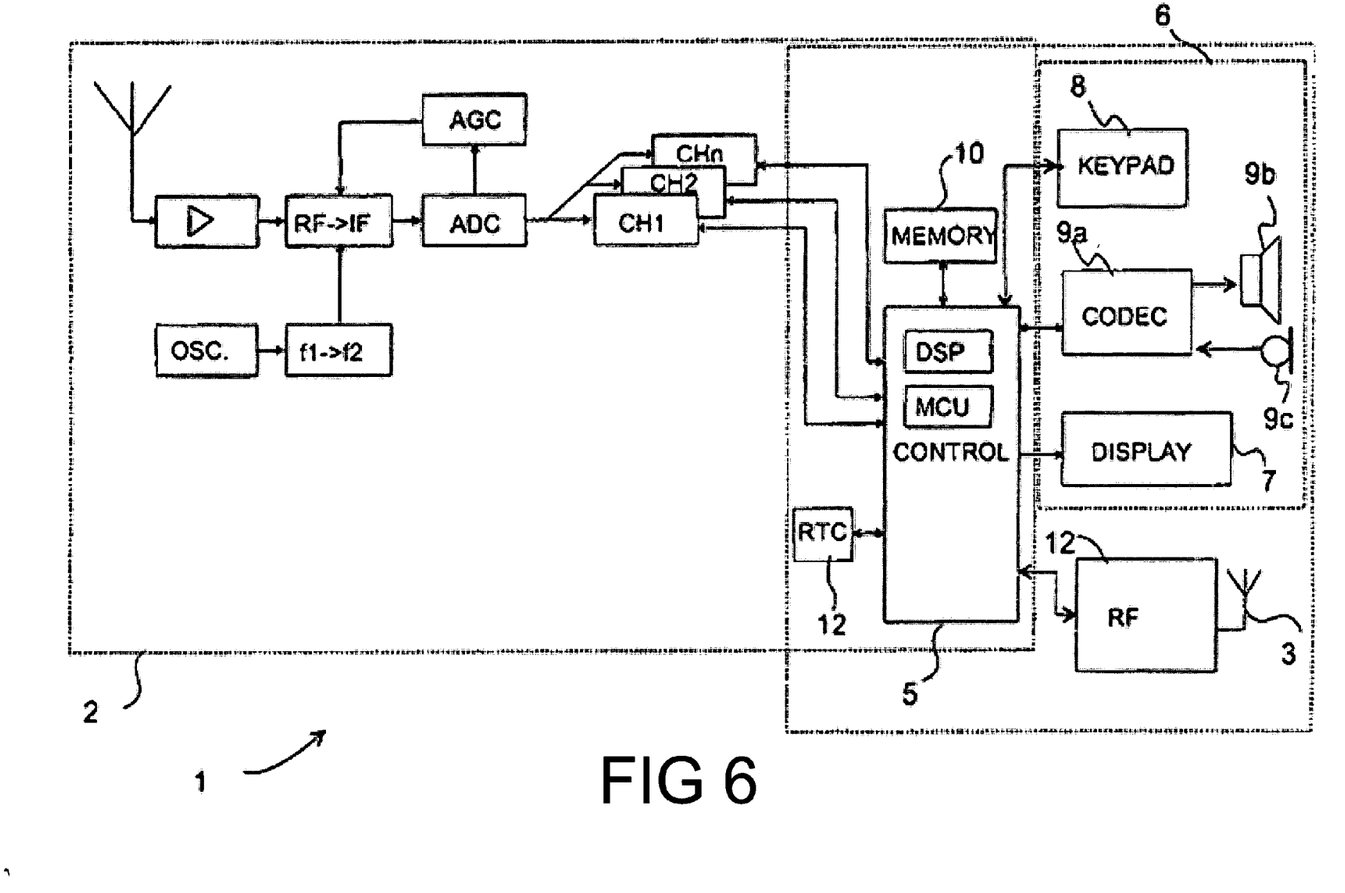
FIG. 6 is a schematic representation of a positioning receiver constructed according to one embodiment of the present invention.

The circuitry for a typical receiver according to one embodiment of the present invention is shown in FIG. 6 in a simplified block diagram. The electronic device 1 of FIG. 6 comprises, for example, a positioning receiver 2 as well as communication mechanism 3 such as an antenna. By this communication mechanism 3, the electronic device 1 may, if necessary, communicate with a communication network such as a mobile communication network. Furthermore, the electronic device 1 comprises a control block 5 which may comprises a processor MCU and/or a digital signal processor DSP. For the use, the electronic device 1 is provided with at least one user interface 6, comprising a display 7, a keypad 8 and audio system components 9a, 9b, 9c in one embodiment of the invention. For storing data and application software, the electronic device 1 is provided with a memory unit 10. Individual circuits and elements are all of a type well known in the art, for example in the Nokia range of mobile telephones. The receiver 500 of the present invention can be incorporated into devices such as a mobile telephone. The present invention can also be incorporated into a variety of other devices.

As discussed previously, FIG. 1 is a representation of a conventional GNSS receiver correlation channel 100 that is used to track a single satellite channel. Input data from an analog-to-digital converter (not shown) is input to the correlation channel 100. This data is subject to an initial multiplier 105, as well as an early multiplier 107, a late multiplier 109 and a prompt multiplier 111. After being subject to these multipliers, the data is subject to a corresponding early integrate-dump block 113, late integrate-dump block 115 and prompt integrate-dump block 117, respectively. Each pair of multipliers and integrate-dump blocks work to correlate the signal, which is then transmitted for subsequent carrier tracking and data extraction 110 and code tracking 120. Both the carrier tracking and data extraction 110 and the code tracking 120 typically are performed in the software of the receiver 500. The carrier tracking and data extraction 110 ultimately produces message data for use, while the combination of the carrier tracking and data extraction 110 and the code tracking 120 produces measurement data for use. The correlation channel 100 also includes a carrier numerically controlled oscillator (NCO) 130, as well as a code NCO 140. The code NCO 140 generates the code rate clock signal for a code generator 150. The code from the code generator 150 is then fed to a delay line composed of a plurality of delay elements 160, which construct early, late and prompt versions of the generated code for subsequent correlation.

Figure 3:
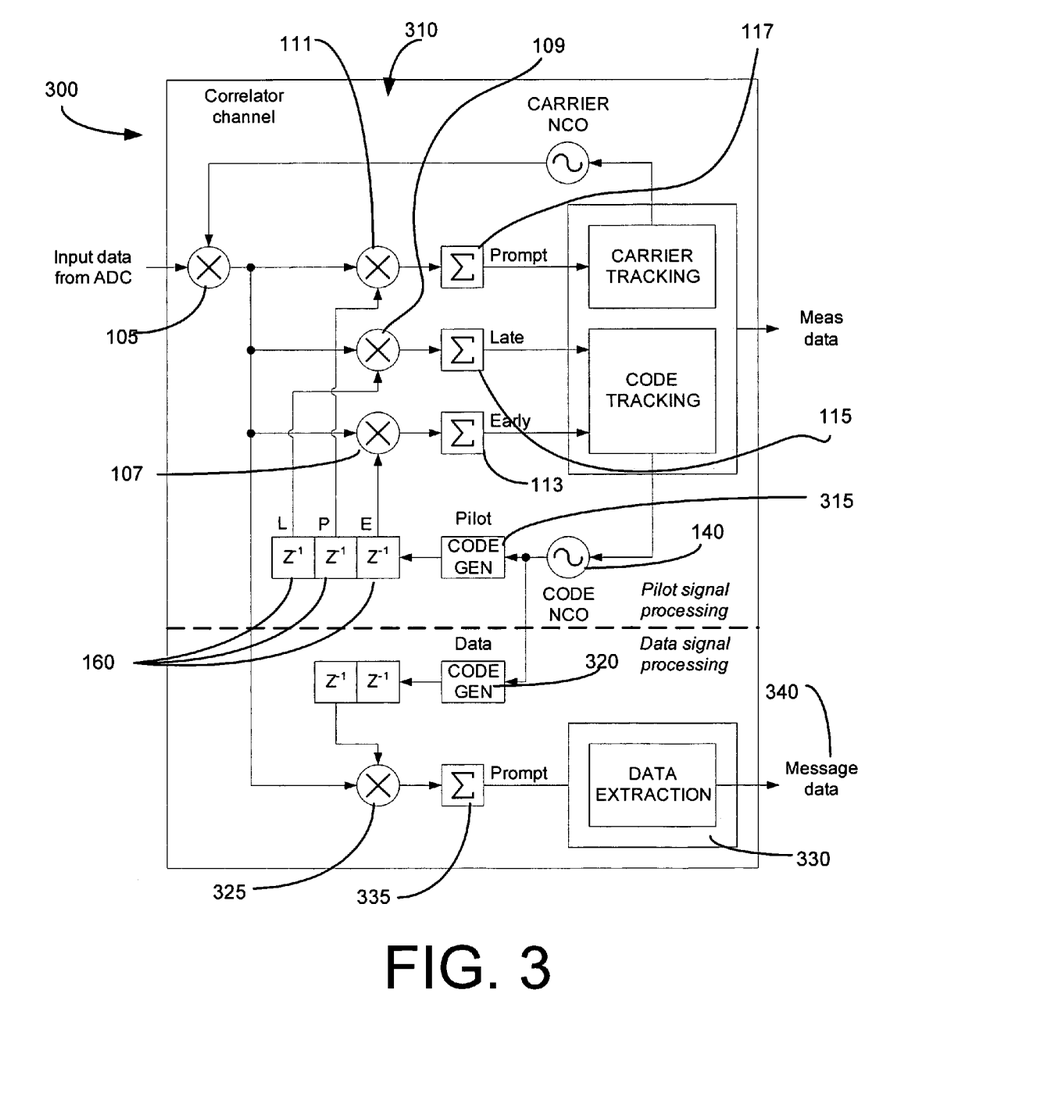
FIG. 3 is a representation of an optimized receiver architecture including an optimized pilot and data signal tracking channel according to one embodiment of the invention.

One embodiment of the present invention is depicted in FIG. 3. FIG. 3 shows an optimized and combined receiver correlation channel architecture 300 that can be used for the simultaneous reception of data. In the optimized receiver correlation channel architecture 300, one complete correlation channel 310 has been implemented. This correlation channel 310 is similar to the correlation channel 100 depicted in FIG. 1. The correlation channel 310 is used to track the pilot signal. A pilot code generator 315 is used to generate pilot data code based upon the code rate clock signal received from the code NCO 140.

In addition, the optimized receiver architecture 300 of FIG. 3 includes a data signal replica code generator 320. The code is removed or wiped off from the received signal by multiplying the incoming signal with correctly aligned locally generated replica code. A data signal multiplier 325 and a data integrate-dump block 335 are used to form the code-correlated data signal. Block 330 performs demodulation, symbol and frame synchronization on the code-correlated data signal in order to recover the message data 340 transmitted by the satellite 520 whose signal is being received. The data signal replica code generator 320 can be controlled by the associated pilot signal tracking loop 350, because the signals are generated at the satellite 520 using a single frequency reference, and the carrier frequency of both signals is the same (leading to identical atmospheric delays). If slightly different carrier frequencies are used for the pilot and data signals, two replicas of the carriers would also be generated. These carriers can be generated using the same concept as is used for the replica code. In this embodiment of the invention, information from the pilot signal is used to track both the pilot signal and the data signal from the respective satellites 520. In this system, only the demodulation of the data signal is necessary, and the hardware for tracking the data signal is not necessary.

Figure 4:
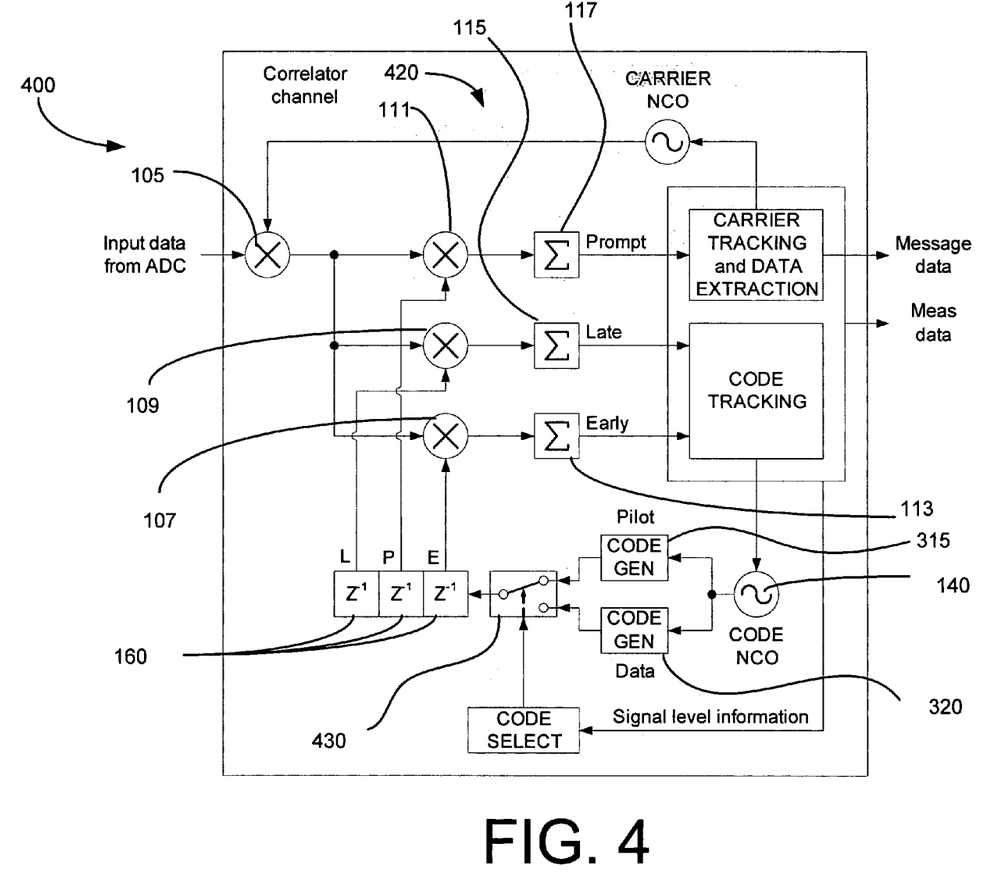
FIG. 4 is a representation of a dynamic pilot and data signal switching system according to another embodiment of the present invention.

A second embodiment of the present invention is depicted in FIG. 4. The architecture 400 of FIG. 4, like the embodiment shown in FIG. 3, includes a separate data signal replica code generator 320 and pilot code generator 315 with a correlation channel which is otherwise substantially identical to the correlation channel of FIG. 1. In the embodiment shown in FIG. 4, however, no separate correlator for the data signal is necessary. A software controllable switch 430 selects between the pilot and data codes. It should also be noted that the separate data signal replica code generator and pilot code generator 320 and 315 and the software controllable switch 430 can be built into a single configurable code generator. Again, if slightly different carrier frequencies are utilized, two switchable carrier replica generators are also required. The tracking software observes the signal level during tracking. This can also be accomplished through the use of tracking hardware. If the level is high enough to allow decoding of the data bits in the data signal, then the tracking is switched. The switching can be performed on the fly because the signals are generated at the satellite 520 using a single frequency reference, and the carrier frequency of both signals is the same (leading to identical atmospheric delays) and both carrier and code phases are known for both the pilot and data signals at all times during tracking of either signal. It is also possible to shut down the unused code generator altogether for the time that is not being used for the aforementioned reasons in order to save power that is needed for operating the receiver. The monitoring of the signal level continues at all times, and if the signal level drops below a threshold for reliable data decoding, the tracking switches back to the pilot signal. It is also possible to switch back to the pilot signal when the signal level is high if the data message is not needed for some reason, e.g. the complete message is already downloaded or the receiver 520 has received the same data by another means such as assistance.

When the receiver 500 begins to search for the satellite signal, there is no need for the data signal receiving parts, as the pilot signal has been designed for superior acquisition performance. With low signal to noise ratios, the data message cannot be received, since the reception requires a certain signal-to-noise ratio (SNR) which is higher than the SNR threshold for tracking. Again, the data signal reception capability is not needed at all. Low SNRs are increasingly common for normal GNSS operation due to requirements for indoor and urban canyon conditions. In many instances, the GNSS receiver 500 can also obtain the satellite data message through more robust communication channels as an assistance mechanism 530, which also makes the need for receiving the data signal unnecessary. However, if the receiver 500 needs to operate in stand-alone mode within "normal" conditions, i.e. the signal level is relatively high, the data signal needs to be received to allow the receiver 500 to produce location information to the user. On the other hand, in such situations using the data signal for tracking after acquisition can provide almost as good measurements as using the pilot signal; therefore the pilot signal is not needed in such cases. Thus, it is generally sufficient to be able to receive one of the two signals at a time, but the capability to receive both signals is still required.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of using a receiver to process multiple signals on a common carrier frequency from a satellite, comprising the steps of:
    having the receiver receive input data transmitted from the satellite;
    if the signal-to-noise ratio of the input data does not meet or exceed a predetermined threshold, using a first code generator to track the input data using a first signal in the input data; and
    if the signal-to-noise ratio of the input data meets or exceeds the predetermined threshold, using a second code generator to track the input data using a second signal in the input data,
    wherein the receiver is capable of switching between the first code generator and the second code generator based upon the signal-to-noise ratio of the input data.

2. The method of claim 1, further comprising the step of, if the receiver has already downloaded message data included within the input data, using the first code generator to track the input data.

3. A computer program product, embodied on a computer readable medium, for using a receiver to process multiple signals on a common carrier frequency from a satellite, comprising the steps of:
    computer code for having the receiver receive input data transmitted from the satellite;
    computer code for, if the signal-to-noise ratio of the input data does not meet or exceed a predetermined threshold, using a first code generator to track the input data using a first signal in the input data; and
    computer code for, if the signal-to-noise ratio of the input data meets or exceeds the predetermined threshold, using a second code generator to track the input data using a second signal in the input data,
    wherein the receiver is capable of switching between the first code generator and the second code generator based upon the signal-to-noise ratio of the input data.

4. The computer program product of claim 3, further comprising computer code for, if the receiver has already downloaded message data included within the input data, using the first code generator to track the input data.

5. A receiver to process multiple signals on a common carrier frequency from a satellite, comprising:
    a first code generator positioned within a correlation channel, the first code generator configured to track a first signal from input data; and
    a second code generator operatively connected to the first code generator, the second code generator configured to track a second signal from the input data,
    wherein if the signal-to-noise ratio of the input data does not meet or exceed a predetermined threshold, the first code generator tracks the input data using the first signal in the input data, and wherein if the signal-to-noise ratio of the input data meets or exceeds the predetermined threshold, the second code generator tracks the input data using the second signal in the input data.

6. The receiver of claim 5, wherein the receiver is capable of switching between the first code generator and the second code generator based upon the signal-to-noise ratio of the input data.

7. The receiver of claim 5, wherein the second signal is used in the computation of location information for the receiver.

8. The receiver of claim 5, wherein the second signal is used to provide communication information to a user of the receiver.

9. The receiver of claim 5, wherein the second code generator transmits replica code for the second signal to a correlator, and wherein the correlator despreads the second signal.

10. A mobile telephone including a GNSS receiver, comprising:

a processor;

a memory unit operatively connected to the processor;

a first code generator positioned within a correlation channel, the first code generator configured to track a first signal from input data; and a second code generator operatively connected to the first code generator, the second code generator configured to track a second signal from the input data, wherein if the signal-to-noise ratio of the input data does not meet or exceed a predetermined threshold, the first code generator tracks the input data using the first signal in the input data, and wherein, if the signal-to-noise ratio of the input data meets or exceeds the predetermined threshold, the second code generator tracks the input data using the second signal in the input data.

11. The mobile telephone of claim 10, wherein the receiver is capable of switching between the first code generator and the second code generator based upon the signal-to-noise ratio of the input data.

* * * * *